(12) United States Patent
Okazawa

(10) Patent No.: US 6,973,902 B2
(45) Date of Patent: Dec. 13, 2005

(54) ENGINE FOR A VEHICLE

(75) Inventor: Goichi Okazawa, Shizuoka-ken (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/912,589

(22) Filed: Aug. 5, 2004

(65) Prior Publication Data

US 2005/0045131 A1 Mar. 3, 2005

(30) Foreign Application Priority Data

Aug. 8, 2003 (JP) .............................. 2003-290203

(51) Int. Cl.$^7$ ................................................ F01L 1/02
(52) U.S. Cl. ............................... 123/90.31; 123/90.27; 123/196 R
(58) Field of Search .......................... 123/90.15, 90.16, 123/90.17, 90.18, 90.27, 90.31, 90.6, 193.5, 123/193.3, 193.4, 196 R, 198 F; 277/591, 277/651, 910; 184/18, 6.8, 15.1; 474/28

(56) References Cited

U.S. PATENT DOCUMENTS 6,325,031 B1 * 12/2001 Takano ..................... 123/90.17
6,491,010 B2 * 12/2002 Kawamoto et al. ...... 123/90.27

FOREIGN PATENT DOCUMENTS

JP 2000-240743 9/2000

* cited by examiner

Primary Examiner—Thomas Denion
Assistant Examiner—Ching Chang
(74) Attorney, Agent, or Firm—Hogan & Hartson, LLP

(57) ABSTRACT

An engine for a vehicle includes a cam chain tensioner actuated by pressure of lubricating oil for stabilizing a movement of a cam chain, a lubricating oil passage through which the lubricating oil is supplied to cam shafts in a cylinder head and a branched lubricating oil passage, branched from the lubricating oil passage, through which the lubricating oil is supplied to the cam chain tensioner. The branched lubricating oil passage is branched from the lubricating oil passage at a portion on an upstream side of an orifice in the lubricating oil passage located upstream of the cylinder head, and in communication with the cam chain tensioner.

20 Claims, 6 Drawing Sheets

ENGINE FOR A VEHICLE

BACKGROUND OF THE INVENTION

1. Field of the Invention

This invention relates to an engine for a vehicle with a cam chain tensioner actuated by the pressure of lubricating oil for stabilizing the movement of a cam chain.

2. Description of Related Art

In an engine for a vehicle for transmitting rotation of a crankshaft to cam shafts, a system has been known in which a cam chain tensioner using a plunger adapted to be pushed out by oil pressure, is provided to stabilize the movement of a cam chain.

In some cam tenioners of this type, a passage through which lubricating oil is supplied to the cam tensioner, is provided with a delivery pipe separate from a crankcase and lubricating oil is supplied to the cam chain tensioner through the delivery pipe. In a system with piping such as a separate delivery pipe as described above, it is necessary that interference with other members is avoided, which places restrictions on the layout and increases the number of parts, causing increased manufacturing costs.

In some systems, the cam chain tensioner is mounted to a head cylinder and lubricating oil is supplied to the cam chain tensioner from a lubricating oil passage formed in the head cylinder. In this case, however, the pressure of the lubricating oil is decreased because of the lubricating oil being supplied from the lubricating oil passage in the head cylinder on the downstream side, or the pressure of lubricating oil is decreased because of air mixed in the lubricating oil.

SUMMARY OF THE INVENTION

An advantage of this invention is to provide an engine for a vehicle capable of effecting cost reduction due to a layout placing no restriction on other parts and a decreased number of parts, and of securing a high pressure to a cam chain tensioner.

In order to achieve the foregoing advantage, this invention is arranged as follows.

An engine for a vehicle includes a cam chain tensioner actuated by the pressure of lubricating oil for stabilizing the movement of a cam chain, a lubricating oil passage through which lubricating oil is supplied to cam shafts in a cylinder head and a branched lubricating oil passage, branched from the lubricating oil passage, through which lubricating oil is supplied to the cam chain tensioner. The branched lubricating oil passage is branched from the lubricating oil passage at a portion on the upstream side of an orifice in the lubricating oil passage located upstream of the cylinder head and in communication with the cam chain tensioner.

The cam chain tensioner is mounted to a cylinder block and the cylinder block is formed with the branched lubricating oil passage.

A tensioner-mounting seat face for the cam chain is located in the direction away from the cam chain with respect to the lubricating oil passage to the cylinder head when viewed in the direction of the cylinder axis.

The branched lubricating oil passage is machined from the side of a mounting opening of the tensioner-mounting seat face.

The branched lubricating oil passage opens to a region a given distance inward from the mounting opening of the tensioner-mounting seat face.

An engine for a vehicle includes a cam chain tensioner actuated by the pressure of lubricating oil for stabilizing the movement of a cam chain, a lubricating oil passage through which lubricating oil is supplied to cam shafts in a cylinder head and a branched lubricating oil passage, branched from the lubricating oil passage, through which lubricating oil is supplied to the cam chain tensioner. The cam tensioner has a plunger for applying a thrust force to a tensioner shoe, a lubricating oil chamber for supplying pressure to the plunger and an air vent passage in communication with the highest position of the lubricating oil chamber.

The air vent passage is in communication with a mounting hole of the cam chain tensioner and the mounting hole opens to a cam chain chamber for the cam chain and the opening is chamfered at its upper edge.

In the invention of claim 1, the branched lubricating oil passage through which oil pressure is supplied to the cam chain tensioner, is branched from a lubricating oil passage at a portion on the upstream side of an orifice in the lubricating oil passage located upstream of a cylinder head. Therefore, a pressure drop caused by the orifice is prevented and a high pressure can be secured.

The cylinder block is formed with a branched lubricating oil passage. Therefore, particularly when the engine is mounted on a vehicle such as a motorcycle, the layout without placing any restriction on other parts is possible compared with when the lubricating oil passage is provided in the cylinder head or around the crankcase. Also, the lubricating oil passage is formed by machining directly in the cylinder block. Therefore, cost reduction due to decreased number of parts can be effected.

The tensioner-mounting seat face for the cam chain tensioner is located in the direction away from the cam chain with respect to the cylinder head. Therefore, the cam chain tensioner is mounted at an outwardly protruded position and interfacing with the lubricating oil passage can be avoided, facilitating machining.

The branched lubricating oil passage is machined from the side of a mounting opening of the tensioner-mounting seat face using the mounting opening. Therefore, a plug for the machine hole, or the like is not required.

The branched lubricating oil passage opens to a region a given distance inward from the mounting opening of the tensioner-mounting seat face. Therefore, the cam chain tensioner can be sealed with an O-ring or the like.

The cam chain tensioner has an air vent passage in communication with the highest position of the lubricating oil chamber for supplying pressure to the plunger. Therefore, air vent of the lubricating oil chamber can be performed irrespective of the mounting angle of the cam chain tensioner, securing a high pressure.

The air vent passage is in communication with the mounting hole of the cam chain tensioner. Therefore, an air vent passage in the cam chain tensioner is simply required, facilitating machining of the air vent passage.

The mounting hole opens to the cam chain chamber for the cam chain and the opening is chamfered at its upper edge. Therefore, air passing out from the mounting hole can be discharge reliably to the chain chamber.

DETAILED DESCRIPTION OF THE PREFERRED EMBODIMENTS

Although an embodiment of the engine for a vehicle of this invention will be described below with reference to the drawings, this invention is not limited to this embodiment. Also, the embodiment of this invention shows a best mode of the invention and technical terms of this invention are not limited to those used herein.

Figure 1:
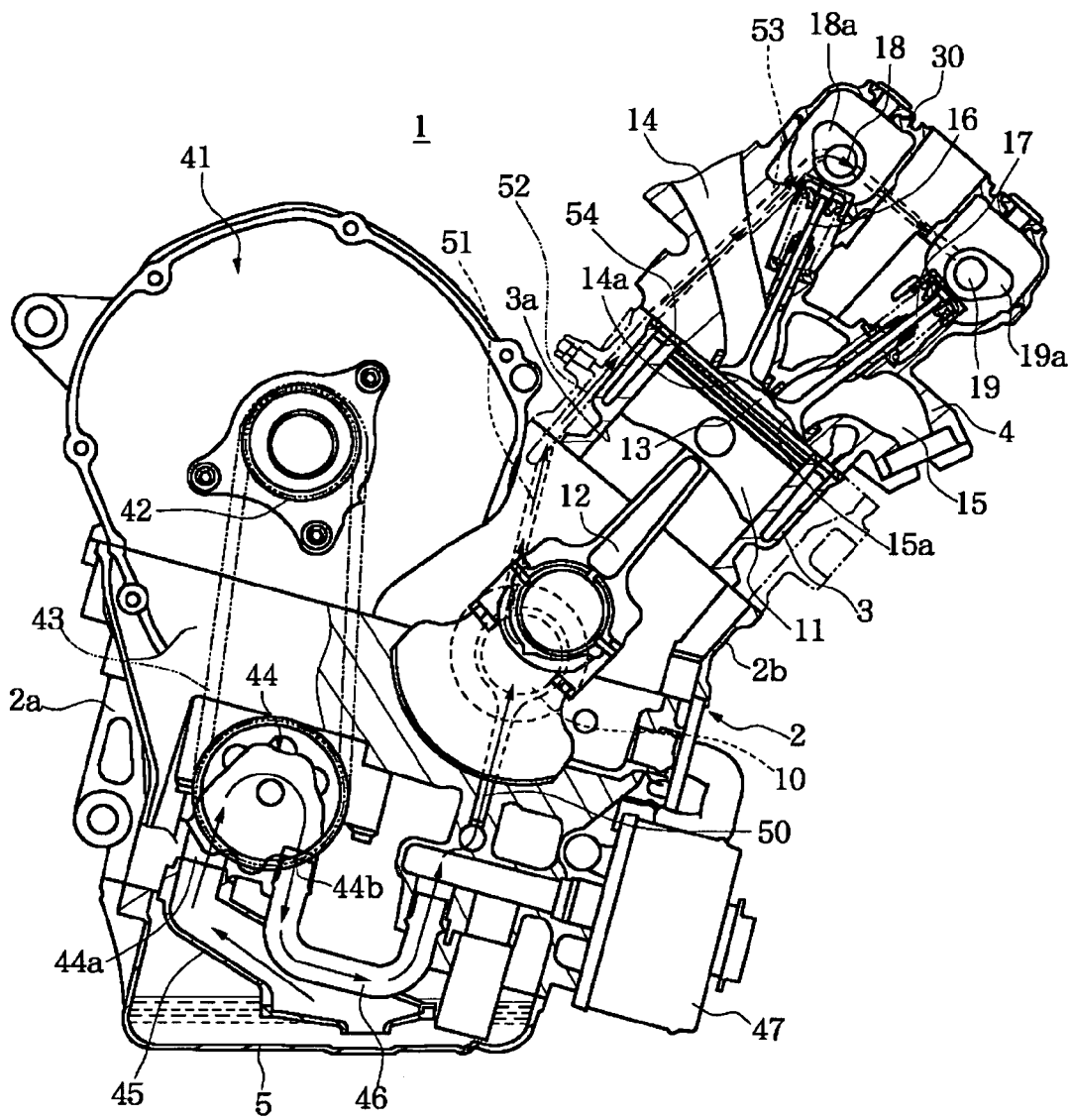
FIG. 1 is a side view of an in-line multi-cylinder engine.
Figure 2:
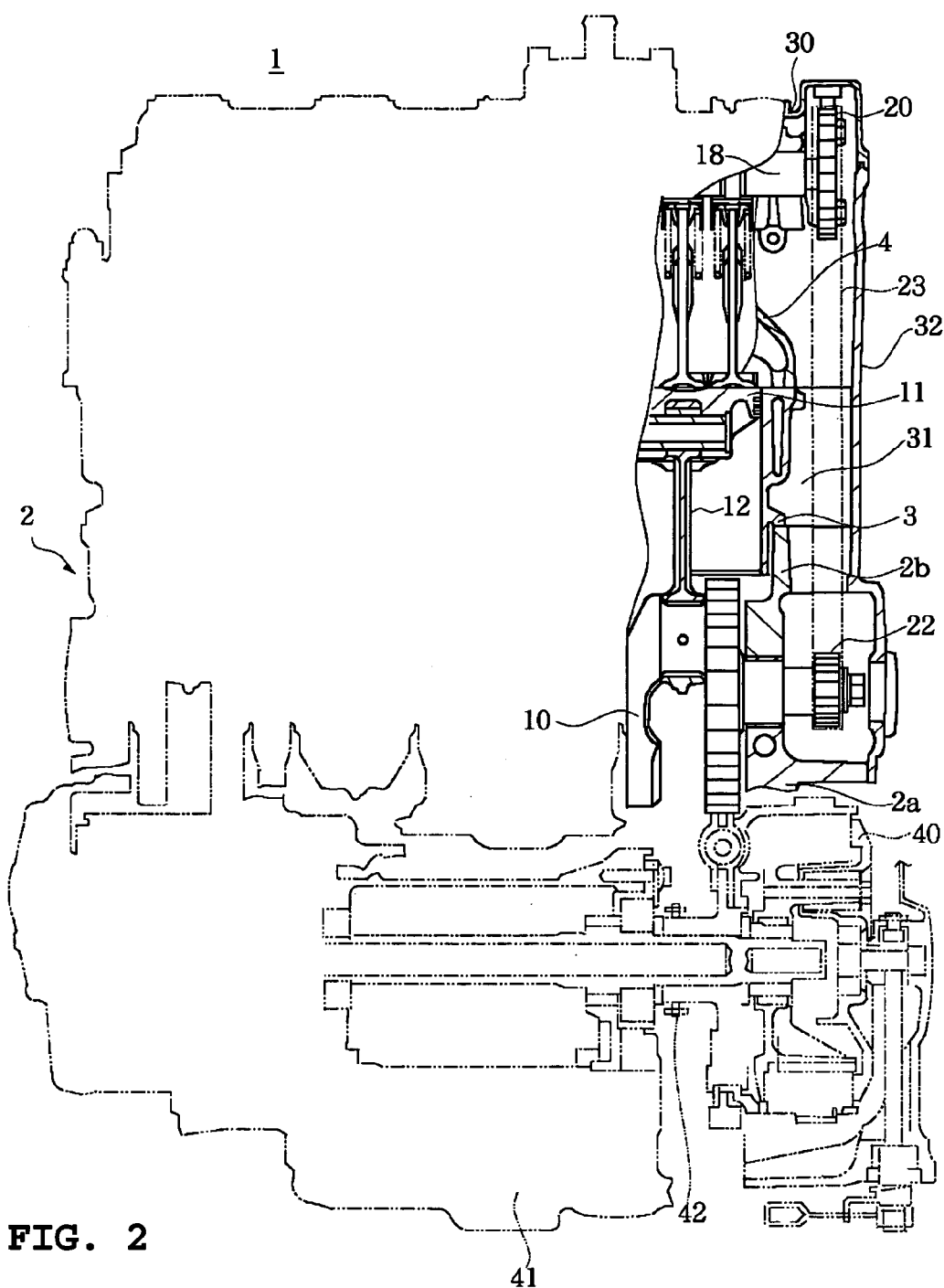
FIG. 2 is a sectional view of a cam chain chamber of the in-line multi-cylinder engine.
Figure 3:
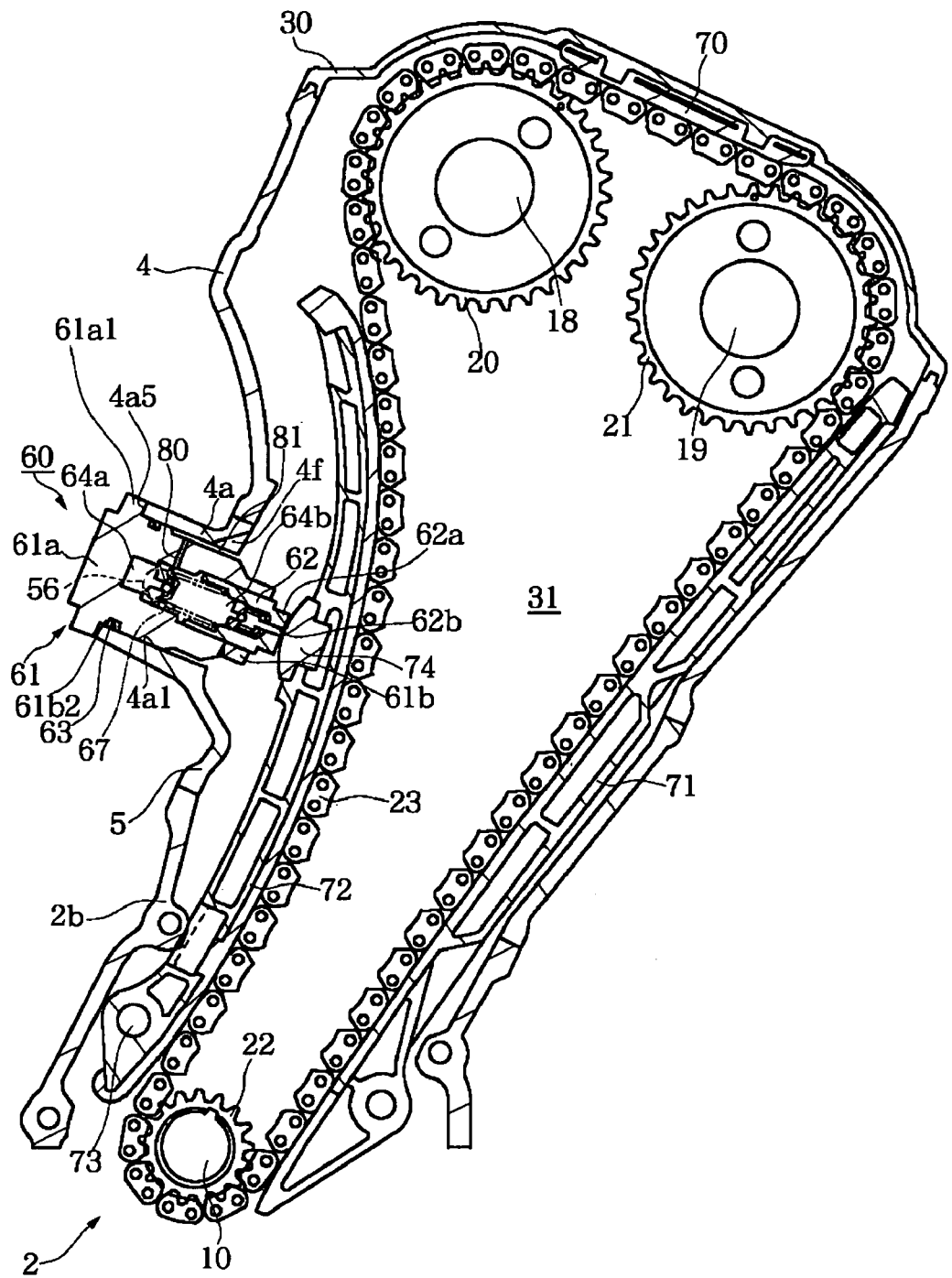
FIG. 3 is a side view of the cam chain chamber of the in-line multi-cylinder engine.
Figure 4:
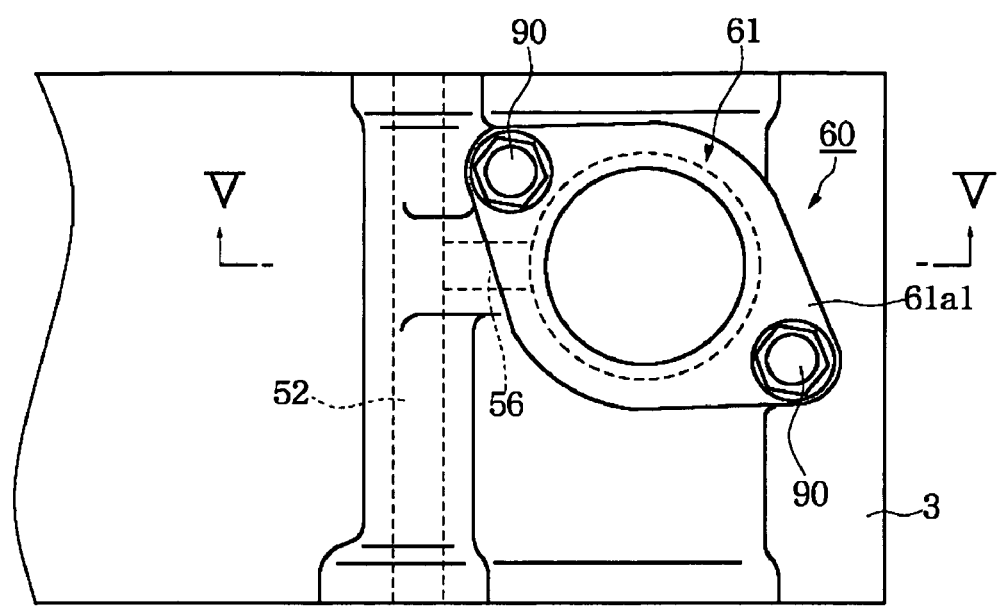
FIG. 4 is a plan view of the mounting portion of a cam chain tensioner.
Figure 5:
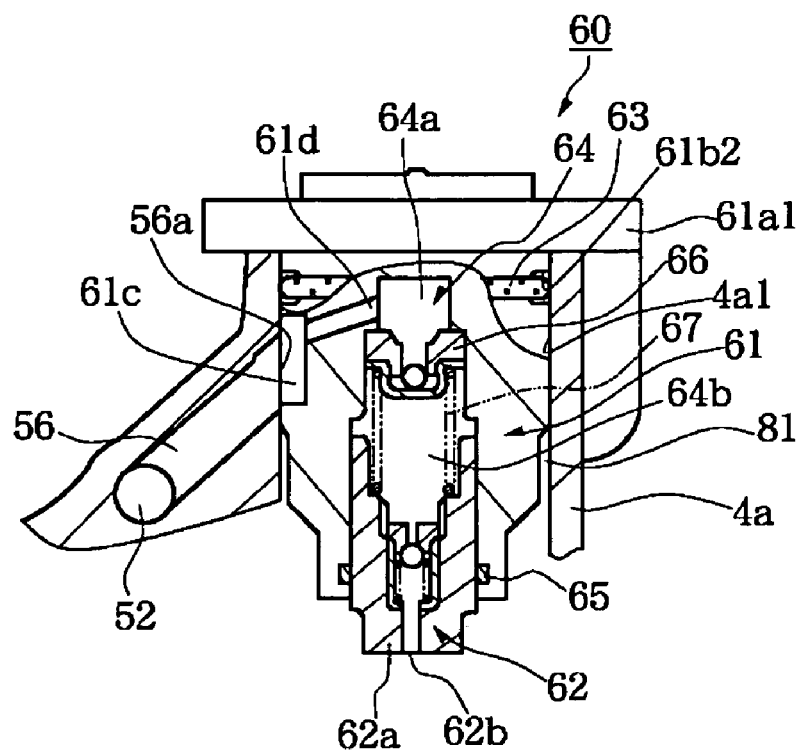
FIG. 5 is a sectional view taken along the line V—V of FIG. 4.
Figure 6:
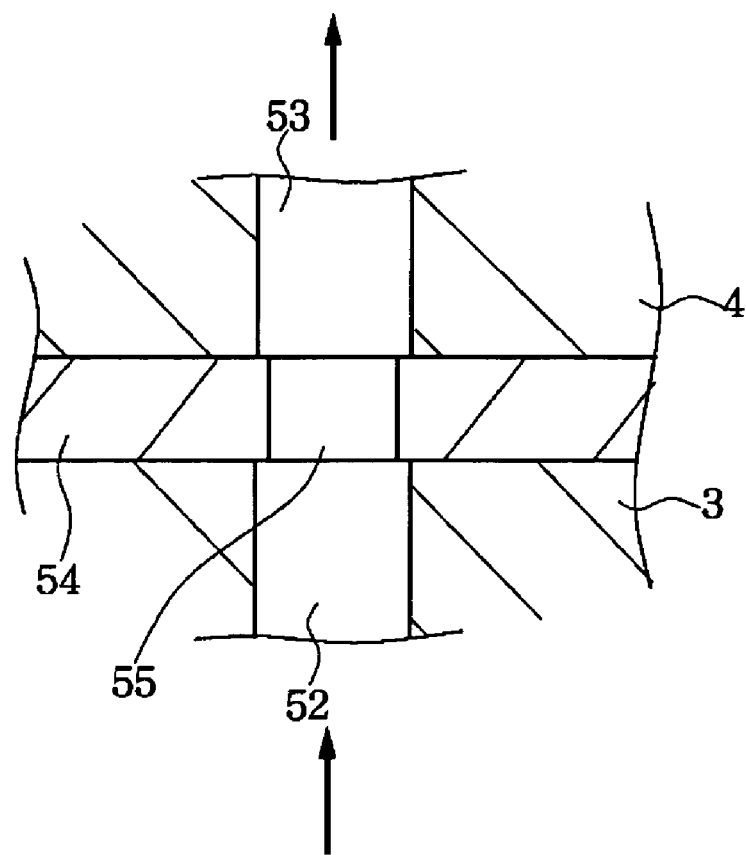
FIG. 6 is a sectional view showing an orifice in a lubricating oil passage.

FIG. 1 is a side view of an in-line multi-cylinder engine in a posture when mounted on a vehicle. FIG. 2 is a sectional view of a cam chain chamber of the in-line multi-cylinder engine. FIG. 3 is a side view of the cam chain chamber of the in-line multi-cylinder engine. FIG. 4 is a plan view of the mounting portion of a cam chain tensioner. FIG. 5 is a sectional view taken along the line V—V of FIG. 4. FIG. 6 is a sectional view showing an orifice in a lubricating oil passage.

An engine for a vehicle 1 in this embodiment has a crankcase 2, a cylinder block 3 and a cylinder head 4. The crankcase 2 includes a lower case 2a and an upper case 2b, an oil pan 5 joined to the lower case 2a at the bottom, and a cylinder block 3 to the upper case 2b at the top. A plurality of cylinders 3a is disposed in the cylinder block 3 in series and the cylinder head 4 is joined to the cylinder block 3 at the top.

A crankshaft 10 is supported on the mating surfaces of the lower case 2a and upper case 2b, as in known engines. Pistons 11 disposed in the plurality of cylinders 3a are connected to the crankshaft 10 through connecting rods 12. The cylinder 3a, the head of the piston 11 and the recess of the cylinder head 4 define a combustion chamber 13, and the cylinder head 4 is formed with an intake passage 14 and an exhaust passage 15 each open to the combustion chamber 13.

The cylinder head 4 is provided with an intake valve 16 capable of opening/closing an opening 14a of the intake passage 14, and an exhaust valve 17 capable of opening/closing an opening 15a of the exhaust passage 15. The intake valve 16 and exhaust valve 17 are actuated for opening/closing by cams 18a, 19a on cam shafts 18, 19 disposed corresponding to the valves, respectively. The cylinder head 4 is covered by a head cover 30.

The cam shafts 18, 19 are provided, at one ends, with sprockets 20, 21, respectively; a cam chain 23 is looped over the sprockets 20, 21 and a drive sprocket 22 provided on the crankshaft 10. The cam shafts 18, 19 rotate in association with the rotation of the crankshaft 10 and the intake valve 16 and exhaust valve 17 are opened/closed at given timings by the cams 18a, 19a on the cam shafts 18, 19.

In the engine for a vehicle 1 of this embodiment, as shown in FIG. 2 and FIG. 3, a cam chain chamber 31 for a cam chain 23 is disposed at the side of the crankcase 2, cylinder block 3 and cylinder head 4, and the cam chain chamber 31 is covered by a side cover 32.

Power of the crankshaft 10 is transmitted to a transmission 41 through a clutch 40 and from the transmission 41 to a drive wheel through a power transmission mechanism. The transmission 41 is provided with an oil pump drive sprocket 42 and the oil pump drive sprocket 42 drives an oil pump 44 through an oil pump drive chain 43. The oil pump 44 is dispose at the side of the lower case 2a, as shown in FIG. 1, and has a suction port 44a and a delivery port 44b. A drawing pipe 45 disposed in the oil pan 5 is connected to the suction port 44a of the oil pump 44. A feed pipe 46 is connected to the delivery port 44b. The feed pipe 46 is connected to an oil cooler 47 and drive of the oil pump 44 draws up lubricating oil collected in the oil pan 5 and sends it to the oil cooler 47.

Lubricating oil cooled by the oil cooler 47 is sent to bearings or the like of the crankshaft 10 through a lubricating oil passage 50 formed in the lower case 2a and further to lubricating portions of the pistons 11 and connecting rods 12 for lubrication. Further, lubricating oil is sent from the lubricating oil passage 51 to a lubricating oil passage 52 formed in the cylinder block 3 and from the lubricating oil passage 52 to a lubricating oil passage 53 formed in the cylinder head 4 and to bearings of the cam shafts 18, 19 through the lubricating oil passage 53, for lubrication.

A gasket 54 is disposed between the cylinder block 3 and cylinder head 4, as shown in FIG. 6. The gasket 54 is formed with an orifice 55, and the orifice causes the passage between the lubricating oil passage 52 and lubricating oil passage 53 to be decreased in diameter into the form of a choke. Lubricating pressure of the lubricating oil passages 50, 51, 52 is prevented from being lowered on the upstream side of the orifice 55, and the bearings or the like of the crankshaft 10 and the lubricating portions of the pistons 11 and connecting rods 12 can be lubricated reliably.

In this embodiment of the engine for a vehicle 1, there are provided a cam chain tensioner 60 actuated by the pressure of lubricating oil for stabilizing the movement of the cam chain 23, lubricating oil passages 50, 51, 52, 53 through which lubricating oil is supplied to the cam shafts 18, 19 in the cylinder head 4, and a branched lubricating oil passage 56, branched from the lubricating oil passage 52, through which lubricating oil is supplied to the cam chain tensioner 60.

Tensioner shoes 70, 71, 72 are in working contact with the cam chain 23. The tensioner shoe 70 is fixed to the head cover 30, the tensioner shoe 71 is fixed to the side cover 32, and the tensioner shoe 72 is provided on the side cover 32, for an opening/closing movement, with a support shaft 73 as a pivot.

The cam chain tensioner 60 has a plunger body 61 and a plunger 62, as shown in FIG. 4 and FIG. 5. The cylinder block 4 is formed with a mounting portion 4a projecting in the shape of a boss, and the mounting portion 4a is formed with a mounting hole 4a1.

The plunger body 61 is formed, at its head 61a, with a flange 61a1, and at its stem 61b, with an annular recess 61b2, and an O-ring 63 is fitted in the annular recess 61b2. The stem 61b of the plunger body 61 is inserted in the mounting hole 4a1, the flange 61a1 is brought into abutment against a tensioner-mounting seat face 4a5 of the mounting portion 4a, and the flange 61a1 is fastened fixedly to the mounting portion 4a with fastening bolts 90. The clearance between the plunger body 61 and mounting hole 4a1 is sealed with the O-ring 63.

The plunger 62 is provided in the plunger body 61 for a sliding movement and the plunger 62 and plunger body 61 define a lubricating oil chamber 64 for supplying pressure to the plunger 62. A circlip 65 is fitted on the plunger 62.

A support body 66 is disposed in the lubricating oil chamber 64, and the support body 66 divides the lubricating oil chamber into a first lubricating oil chamber 64a and a second chamber 64b. A spring 67 is disposed, being compressed, between the support body 66 and plunger 62, biasing the plunger 62 in a direction for its forward end 62a to be in working contact with a receiving body 74 of the tensioner shoe 72, and the plunger 62 is formed with a delivery passage 62b.

The plunger body 61 is formed with a recess 61c facing an opening 56a of the branched lubricating oil passage 56, and an induction passage 61d is formed extending from the recess 61c and in communication with the first chamber 64a.

In the cam chain tensioner 60 of this embodiment, lubricating oil is supplied to the first chamber 64a through the branched lubricating oil passage 56 and the induction passage 61d and from the first chamber 64a to the second chamber 64b.

This lubricating oil supply causes a pressure rise in the second chamber 64b, so that the plunger body 61 moves forward and the forward end 62a of the plunger 62 pushes the receiving body 74 of the tensioner shoe 72, applying a thrust force to the tensioner shoe 72.

The plunger 62 is pushed out by the force of the spring 67, and the plunger 62 receives a force from the tensioner shoe 72 stabilizing the movement of the cam chain 23 by the damping effect of the second chamber 64b filled with oil. When the pressure of the second chamber 64b exceeds a given value, lubricating oil is discharged from the delivery passage 62b of the plunger 62 to the cam chain chamber 31. In this way, the cam tensioner 60 can be actuated by the pressure of lubricating oil to stabilize the movement of the cam chain 23.

In the lubricating oil chamber 64 for supplying pressure to the plunger 62, as shown in FIG. 3, an air vent passage 80 in communication with the highest position of the lubricating oil chamber 64 of the first chamber 64a is formed, being directed radially outwardly, in the stem 61b of the plunger body 61. The air vent passage 80 has an opening 80a to the outside of the stem 61b and in communication with the mounting hole 4a1 of the cam chain tensioner 60.

The forward portion of the stem 61b of the plunger body 61 from the opening 80a of the air vent passage 80 is decreased in diameter to form a small clearance 81 between the stem and the wall of the mounting hole 4a1 and air is discharged from the opening 80a of the air vent passage 80 to the clearance 81.

The mounting hole 4a1 opens to the cam chain chamber 31 for the cam chain 23, and the opening is formed, at its upper edge, with a chamfer 4f. The chamfer 4f is formed such that the stem 61b of the plunger body 61 is opened up to a region near the opening 80a of the air vent passage 80, and air passing out from the air vent passage 80 to the clearance 81 formed in the mounting hole 4a1 can be discharged reliably to the chain chamber 31.

If the highest position of the lubricating oil chamber for supplying pressure to the plunger 62 corresponds to the forward end 62a of the plunger 62, depending on the placement of the cam chain tensioner 60 in this embodiment, air mixed in the lubricating oil can be discharged to the chain chamber 31 through the delivery passage 62b.

Even if the highest position of the lubricating oil chamber for supplying pressure to the plunger 62 corresponds, not to the forward end 62a of the plunger 62, but to the first chamber 64a of the lubricating oil chamber 64 for supplying pressure to the plunger 62, depending on the placement of the cam chain tensioner 60, because of the air vent passage 80 being provided in communication with the first chamber 64a at the highest position, when air mixed in the lubricating oil is collected in the first chamber 64a, the air flows through the air vent passage 80 into the clearance 81 of the mounting hole 4a1 and air passing out from the clearance 81 of the mounting hole 4a1 can be discharged reliably to the chain chamber 31 through the chamfer 4f at the upper edge of the opening.

Also, if the second chamber 64b of the lubricating oil chamber 64 corresponds to the highest position, depending on the placement of the cam chain tensioner 60, an air vent passage is formed in communication with the second chamber 64b. Therefore, air vent of the lubricating oil chamber 64 can be performed irrespective of the mounting angle of the cam chain tensioner 60, a pressure drop of lubricating oil due to air can be prevented and a high pressure can be secured.

Also, the air vent passage 80 is in communication with the clearance 81 of the mounting hole 4a1, therefore machining of the air vent passage 80 in the plunger body 61 is simply required, facilitating machining of the air vent passage 80. An air vent passage may be machined in the plunger 62, depending on the mounting angle of the cam chain tensioner 60.

The branched lubricating oil passage 56 in this embodiment is branched from the lubricating oil passage 52 at a portion on the upstream side of the orifice 55 in the lubricating oil passage 52 located upstream of the cylinder head 4, and in communication with the cam chain tensioner 60, as shown in FIG. 6, so that a pressure drop in the lubricating oil chamber 64 of the cam chain tensioner 60 due to the orifice 55 can be prevented, securing a high pressure. Therefore, the cam chain tensioner 60 can be actuated without need of size increase in the oil pump 44.

Also, the cam chain tensioner 60 is mounted to the mounting portion 4a of the cylinder block 3 and the cylinder block 3 is formed with the branched lubricating oil passage 56. Therefore, particularly when the engine is mounted on a vehicle such as a motorcycle, the layout without placing any restriction on other parts is possible compared with when the lubricating oil passage is provided in the cylinder head 4 or around the crankcase 2, and the branched lubricating oil passage 56 is formed by machining directly in the cylinder block 3, effecting cost reduction due to a decreased number of parts.

Also, as shown in FIG. 3, the tensioner-mounting seat face 4a5 for the cam chain tensioner 60 is located in the direction away from the cam chain 23 with respect to the lubricating oil passage 52 to the cylinder head 4 when viewed in the direction of the cylinder axis. The cam chain tensioner 60 is mounted at an outwardly protruded position and interference with the lubricating oil passage 52 is avoided, facilitating machining.

Also, the branched lubricating oil passage 56 is machined by a tool from the side of a mounting opening of the tensioner-mounting seat face 4a5, as shown in FIG. 5, and by using the mounting opening of the mounting hole 4a1 for the cam chain tensioner 60. Therefore, a plug for the machine hole, or the like is not required. In addition, the opening 56a of the branched lubricating oil passage 56 is located in a region a given distance inward from the mounting opening of the tensioner-mounting seat face 4a5. Therefore, the cam tensioner 60 can be sealed with an O-ring or the like.

Although in this embodiment, the air vent passage 80 is formed by drilling of a small hole in the plunger body 61, this invention is not limited to that, and a screw hole may be formed, in which is fitted a screw, and a small clearance between the screw hole and the screw may be used as an air vent passage.

This invention can be applied to an engine for a vehicle with a cam chain tensioner actuated by the pressure of lubricating oil for stabilizing the tension of a cam chain.

What is claimed is:

1. An engine for a vehicle, comprising:
    a cam chain tensioner actuated by pressure of lubricating oil for stabilizing a movement of a cam chain;
    a lubricating oil passage through which the lubricating oil is supplied to cam shafts in a cylinder head; and
    a branched lubricating oil passage, branched from the lubricating oil passage, through which the lubricating oil is supplied to the cam chain tensioner,
    wherein the branched lubricating oil passage is branched from the lubricating oil passage at a portion on an upstream side of an orifice in the lubricating oil passage located upstream of the cylinder head, and in communication with the cam chain tensioner.

2. The engine for a vehicle of claim 1, wherein the cam chain tensioner is mounted to a cylinder block and the cylinder block is formed with the branched lubricating oil passage.

3. The engine for a vehicle of claim 2, wherein a tensioner-mounting seat face for the cam chain is located in a direction away from the cam chain with respect to the lubricating oil passage to the cylinder head when viewed in a direction of a cylinder axis.

4. The engine for a vehicle of claim 1, wherein a tensioner-mounting seat face for the cam chain is located in a direction away from the cam chain with respect to the lubricating oil passage to the cylinder head when viewed in a direction of a cylinder axis.

5. The engine for a vehicle of claim 4, wherein the branched lubricating oil passage is machined from a side of a mounting opening of the tensioner-mounting seat face.

6. The engine for a vehicle of claim 4, wherein the branched lubricating oil passage opens to a region a given distance inward from a mounting opening of the tensioner-mounting seat face.

7. The engine for a vehicle according to claim 1, further comprising tensioner shoes in working contact with the cam chain.

8. The engine for a vehicle according to claim 7, wherein the tensioner shoes are fixed to a head cover.

9. The engine for a vehicle according to claim 1, wherein the cam shaft rotate in association with a crankshaft.

10. The engine for a vehicle according to claim 1, wherein the cylinder head is covered by a head cover.

11. The engine for a vehicle according to claim 1, wherein the lubricating oil is cooled by an oil cooler.

12. An engine for a vehicle, comprising:
    a cam chain tensioner actuated by pressure of lubricating oil for stabilizing a movement of a cam chain;
    a lubricating oil passage through which the lubricating oil is supplied to cam shafts in a cylinder head; and
    a branched lubricating oil passage, branched from the lubricating oil passage, through which the lubricating oil is supplied to the cam chain tensioner,
    wherein the cam tensioner has a plunger for applying a thrust force to a tensioner shoe, a lubricating oil chamber for supplying pressure to the plunger, and an air vent passage in communication with a highest position of the lubricating oil chamber.

13. The engine for a vehicle of claim 12, wherein the air vent passage is in communication with a mounting hole of the cam chain tensioner.

14. The engine for a vehicle of claim 13, wherein the mounting hole opens to a cam chain chamber for the cam chain and an opening is chamfered at its upper edge.

15. The engine for a vehicle according to claim 12, further comprising tensioner shoes in working contact with the cam chain.

16. The engine for a vehicle according to claim 15, wherein the tensioner shoes are fixed to a head cover.

17. The engine for a vehicle according to claim 12, wherein the cam shaft rotate in association with a crankshaft.

18. The engine for a vehicle according to claim 12, wherein the cylinder head is covered by a head cover.

19. The engine for a vehicle according to claim 12, wherein the lubricating oil is cooled by an oil cooler.

20. A method for manufacturing an engine for a vehicle, comprising:
    actuating a cam chain tensioner by pressure of lubricating oil for stabilizing a movement of a cam chain;
    supplying the lubricating oil through a lubricating oil passage to cam shafts in a cylinder head;
    branching a lubricating oil passage, through which the lubricating oil is supplied to the cam chain tensioner; and
    branching the lubricating oil passage at a portion on an upstream side of an orifice in the lubricating oil passage located upstream of the cylinder head, and in communication with the cam chain tensioner.

* * * * *